United States Patent [19]

Evans

[11] 3,816,335

[45] June 11, 1974

[54] REVERSIBLY THERMOCHROMIC IONICALLY AND RADIATION CROSS-LINKED POLYMERS CONTAINING COBALTOUS IONS

[75] Inventor: Joseph H. Evans, Palo Alto, Calif.

[73] Assignee: Raychem Corporation, Menlo Park, Calif.

[22] Filed: Oct. 14, 1971

[21] Appl. No.: 189,448

Related U.S. Application Data

[63] Continuation of Ser. No. 809,951, March 24, 1969, abandoned.

[52] U.S. Cl.............. 252/408, 252/300, 161/410, 73/356
[51] Int. Cl............................................. C09k 3/00
[58] Field of Search ........... 252/300, 408; 161/410; 73/356

[56] References Cited
UNITED STATES PATENTS

| | | | |
|---|---|---|---|
| 1,777,353 | 10/1930 | Davis | 252/408 X |
| 1,924,793 | 8/1933 | Laske | 252/408 |
| 2,710,274 | 6/1955 | Kuehl | 252/408 X |
| 2,945,305 | 7/1960 | Strickler | 252/408 X |
| 3,192,101 | 6/1965 | Koenig | 161/410 X |
| 3,264,272 | 8/1966 | Rees | 117/161 UT |
| 3,442,749 | 5/1969 | Ward et al. | 161/410 X |

OTHER PUBLICATIONS

Cowling et al., "Temperature –Indicating Paints,"Industrial and Engr. Chem., Oct. 1953, 2,317–2,320.

*Primary Examiner*—Roland E. Martin, Jr.
*Attorney, Agent, or Firm*—Lyon & Lyon

[57] ABSTRACT

Articles having the property of heat recoverability which change color at some stage during heating to cause their recovery. The articles may be translucent or transparent. Preferred articles are those made from ionomers containing certain metal salts. Crosslinked and other novel ionomeric compositions are also disclosed.

8 Claims, No Drawings

REVERSIBLY THERMOCHROMIC IONICALLY AND RADIATION CROSS-LINKED POLYMERS CONTAINING COBALTOUS IONS

BACKGROUND OF THE INVENTION

This is a continuation of application Ser. No. 809,951 filed Mar. 24, 1969, now abandoned.

This invention relates to polymeric compositions exhibiting thermochromism and articles made therefrom.

It has previously been proposed, in U.S. Pat. No. 3,236,651, granted Feb. 22, 1966 to A. M. Marks, et al, to provide thermoplastic polymers which exhibit color changes on exposure to light or on heating. These polymers, for example copolymers of vinyl alcohol and vinyl acetate, have incorporated a transition metal halide, for example cupric chloride or bromide, and a fugitive ligand, for example water. The changes in the color of the exemplary composition are attributed to changes in the environment of the copper ion resulting from the gain or loss of water as a ligand. The color of such a material is, however, sensitive also to the humidity of the atmosphere surrounding the polymeric material. It appears that if the atmosphere is very dry the color will change only very slowly to that corresponding to the water-containing state of the metal ion's environment.

The materials suggested suffer additionally from the disadvantage that they lack form stability at high temperature, which limits the temperature of the color transition (and hence the usefulness of the materials) to within a range below the softening point, or crystalline melting point where appropriate, of the polymer used. Further, the metal halides are incorporated into the polymers by evaporating the solvent from a solution of the halide and the polymer. Such a procedure limits the materials which can be employed as well as the shapes into which the composition can be formed.

In the manufacture and use of heat-recoverable articles, it is frequently desirable or even essential to have a readily available indication of the temperature of the article. Heat recoverable articles are articles which have been deformed from an original dimensional state in which they are stable to heat to a deformed dimensional state in which they are unstable to heat, returning, when heated, to their original stable state. One example of such an article is a heat-shrinkable tube which will remain at a certain diameter until heated to or above a certain temperature, its "recovery temperature," when it will shrink. The use of such a tube for encapsulation, corrosion protection, electrical insulation or decoration is obvious. Materials and processes suitable for the manufacture of heat-recoverable articles are given, for example, in U.S. Pat. No. 2,027,962 granted Jan. 14, 1936 to L. M. Currie, U.S. Pat. No. 3,086,242 granted Apr. 23, 1963 to P. M. Cook, et al, U.S. Pat. No. 3,243,211 granted Mar. 29, 1966 and U.S. Pat. No. 3,297,819 granted Jan. 10, 1967 to J. D. Wetmore, the disclosures of all of which are incorporated herein by reference.

Frequently, heat-recoverable articles are used in proximity to heat-sensitive articles, for example printed circuit boards, and it is necessary to ensure that the temperature of the recoverable article does not exceed a certain maximum. In other circumstances, recovery is carried out in adverse conditions where it may be difficult to ascertain whether a sufficiently high temperature has been reached. For example, the heat recoverable article may be a sleeve having a fusible lining which is to be recovered over a pipe joint in a trench, the lining being designed to aid in sealing the joint. If the sleeve is not heated sufficiently, the lining may not flow sufficiently to achieve the seal.

More recently, heat-recoverable articles have been used as toys and other non-utilitarian goods in which the interest of a child or adult is gained or held by the change in shape of the article on heating. In such a case, it may be desirable to give a warning of the temperature reached by the article.

SUMMARY OF THE INVENTION

It is an object of the invention to provide polymeric thermochromic materials capable of being formed into articles to which may be imparted the property of heat recoverability. It is a further object of the invention to provide materials from which may be made a toy, especially a heat-recoverable toy, having enhanced interest and improved safety. It is another object of the invention to provide heat-recoverable articles showing thermochromism. It is a further object of the invention to provide a simple temperature indicator. Other objects will become apparent from the following description.

The present invention accordingly provides a heat recoverable article formed from a thermochromic composition comprising a polymer having an inorganic compound uniformly dispersed therein.

Examples of thermochromic inorganic compounds are given in an article by Jesse H. Day entitled "Thermochromism of Inorganic Compounds" in Chemical Reviews, 68, 649 (1968) the disclosure of which article is incorporated herein by reference. In Table IV of that article there is given a list of inorganic compounds together with the temperature at which each changes color. The following examples form an extract from that table, but it is to be understood that the scope of this invention is not limited to this extract or the table.

TABLE I

| Compound | Color change on heating | Transition Temperature °C |
|---|---|---|
| $CoCl_2 \cdot 6H_2O$ | Pink to blue | 35 |
| $NiSO_4 \cdot 7H_2O$ | Light green to yellow | 155 |
| HgI | Yellow to orange red | 54–82 |
| CuI | Gray-tan to orange | 60–62 |

The article makes it clear that the temperature of color change (the "transition" temperature) depends on the environment and the rate of heating, and the environment of the compound also influences the rate of the return of the "cold" color on cooling. It is a matter of routine experiment following the guidelines of the article to ascertain the transition temperature of a particular salt in a given polymer composition. It is also a matter of routine experiment to determine the appropriate salt for incorporation into a given polymer, or, where a particular color change or transition temperature is desired, the appropriate polymer for a given salt.

Best results (visually) are achieved when the thermochromic compound can be dispersed homogeneously in the polymer by, for example, the use of a solvent common to the polymer and the compound or by blending the compound into the polymer on a mill. Although thermochromic articles can be made if the inorganic compound is only partially dispersed, normally transparent or translucent polymers are rendered opaque by the particles. Of course, any means of incorporating the thermochromic compound into the polymer, including mixing the two materials in liquid or powder form, may be employed.

After incorporating appropriate thermochromic compounds into a polymer, the composition can be shaped and rendered heat-recoverable by normal methods. For example, polyethylene into which has been blended cobalt stearate can be extruded into a tube, crosslinked by radiation, and expanded to form a heat-shrinkable tube which on heating to cause recovery changes from pink to blue, returning to its original pink color on cooling.

Any of the polymers normally used in the manufacture of heat-recoverable articles may be employed in the present invention. There may be mentioned, for example, polyolefines, e.g., polyethylene, copolymers of ethylene with ethylenically unsaturated monomers, e.g., ethylene/ethyl acrylate, ethylene/vinyl acetate copolymers, polyvinyl chloride, elastomers, silicones, polytetrafluoroethylene, polyurethanes and ionomers, crosslinked where necessary or desired, either by radiation or chemical means. It will be appreciated that those materials which can be rendered heat-recoverable below their softening point, for example polyvinyl chloride, need not but may be crosslinked where for example it is desired to reduce the risk of damage to the article by overheating. Further, the use of crosslinked materials enables thermochromic materials to be incorporated which have transition temperatures above the softening or crystalline melting temperature of the polymer. For example, it may be necessary in some instances to continue heating a recoverable sleeve for some time after recovery has taken place to ensure, for example, that a meltable layer inside the sleeve has been raised to its melting temperature.

The use of a crosslinked polymer in combination with a thermochromic material having a transition temperature at the desired temperature enables an operator to heat the sleeve enough to cause recovery and melting of the meltable layer without danger of heating the sleeve above its decomposition temperature. This is especially advantageous when the sleeve is to be recovered in difficult conditions where it is not possible to measure temperatures readily.

Either crosslinked or non-crosslinked materials may be used when the heat-recoverable article is to be recovered over a substrate sensitive to high temperatures. In such cases, the material may be admixed with a thermochromic material having a transition temperature slightly below the maximum safe temperature of the substrate, so that an operator can readily see that further heat should not be applied to the article or the part of the article whose color has changed.

In a preferred embodiment of the invention, the heat-recoverable article is a toy which changes color at or about the recovery temperature. There have recently been developed a number of toys and games which utilize the property of heat recoverability. For example, an article is molded or otherwise formed into the shape of an animal, real or imaginary, a human, or a monster, the material is crosslinked (if necessary) and distorted into a configuration which conceals the nature of the article from which it was formed, for example by compressing into a plaque or block. The article can then be heated to cause it to recover to its original configuration, and the recovery process proves to be a source of considerable excitement and interest to children and many adults. This interest can be considerably enhanced by using the present invention to cause the article to change its color during the heating process, returning to its original color, but not of course its original shape, on cooling. The color change can also be used as a safety device, since if necessary the child can be warned not to touch the article while it shows its hot color. By constructing articles having a non-constant cross-section, a variety of shades can be achieved during the heating and cooling processes, the thinner portions heating and cooling more rapidly. The thermochromic article may thus be of interest as a toy even without the property of heat-recovery. By incorporating suitable pigments, either in all or part only of the article, different colors can be achieved with the same thermochromic additive. It is also within the scope of the invention to use two or more different thermochromic compounds, either in the same or different parts of the article. The compounds may have the same or different transition temperatures, whereby a variety of effects, both useful and aesthetic, may be achieved by the present invention.

The proportion of thermochromic compound in the composition will be determined, inter alia, by the intensity of color change effect desired, the inherent intensity of the colors exhibited by the compound in its different states, the translucency and thickness of the polymer. Up to 10 percent, based on the weight of the polymer, of the thermochromic compound, will normally be sufficient, but greater or lesser quantities may of course be employed. For small articles which should be transparent or at least translucent, 1 to 2 percent of compound is normally sufficient.

An especially suitable composition for use in the present invention comprises an ionomer containing cobaltous ions. Examples of ionomers suitable for use in this aspect of the invention are those described in U.S. Pat. No. 3,264,272 granted Aug. 22, 1966 to R. W. Rees, the disclosure of which is incorporated herein by reference. These materials are typically copolymers of α-olefins and ethylenically unsaturated acids, some of the acid groups of which copolymers have been "neutralized" by metal ions. Other suitable ionomers are those described in U.S. Pat. No. 3,322,734 granted May 30, 1967 to R. W. Rees, the disclosure of which is incorporated herein by reference. These materials are typically copolymers of α-olefinically unsaturated materials (other than α-olefins) and ethylenically unsaturated acids, some acid groups having been "neutralized" by metal ions.

It is to be understood that the cobaltous ions referred to above are present in addition to the ions present in the polymer to neutralize some of the acid groups. In general, the cobalt compounds suitable for use in the invention are those which will react with the free carboxylic acid group to give a by-product which can be removed from the polymer under the conditions of mixing the polymer and the cobalt salt. For example, the salts of divalent cobalt with nitric, acetic and hydrohalic acids, as well as cobaltous hydroxide, are suitable, these acids and water being volatile at the temperature of blending on a mill, i.e., 150° C. On the other hand, cobaltous sulphate and cobalt hydrogen phosphate have not proved suitable, either because they do not react with the (relatively weak) acid groups of the polymer, because the free acid resulting from any reaction is insufficiently volatile to escape from the polymer, or through a combination of these two effects. In any case, it is a matter of simple experiment to determine the suitability of a particular cobalt compound.

A second group of cobalt compounds comprises those which are miscible with the polymer not by virtue of the presence of a soluble or reactive cobalt cation but because of the nature of the anion. Examples of such materials are the cobaltous salts of fatty acids, especially long chain fatty acids, for example cobalt stearate.

The effect of the metal ions in the copolymer matrix is to make the room temperature properties of the material more closely allied to a crosslinked polymer than non-crosslinked thermoplastic material. On raising the temperature of the ionomer, it becomes more like a thermoplastic material, although its viscosity is higher than that of the parent copolymer, and is melt fabricable. Once, however, all the acid groups are neutralized, no further improvement in either room temperature or melt properties is obtained by adding further metal ions, and the material becomes considerably less tractable in the melt, and it is therefore desirable for the purposes of the present invention to maintain at least a small proportion of free acid groups in the molecule.

The present invention also provides a crosslinked ionomer containing cobaltous ions, and heat recoverable articles formed of such an ionomer. Crosslinking may be achieved either by chemical means or by irradiation. In general, crosslinking methods known to be suitable for crosslinking polyethylene and polymers of ethylenically unsaturated monomers are suitable for crosslinking the cobalt-containing ionomers of the present invention.

The concentration of cobalt ion in the ionomer will depend on the intensity of color change required. As stated above, the quantity of metal ions in the composition should not exceed that sufficient to neutralize all the acid groups. This quantity will exceed the quantity calculated on the basis of stoichiometry so that, in general, it may be assumed that the total metal ion content of the polymer will be at most about the stoichiometric equivalent of the acid groups. The physical properties of the polymer, other than its color, depend more on the degree of neutralization of the acid groups than the identity of the metal ions. In general, about 1 to 2 percent (by weight of the polymer) of a hydrated cobaltous salt, e.g., $CoCl_2 \cdot 6H_2O$, may be added to a commercially available ionomer to give a clearly visible color change with temperature. The color of the polymer is influenced also by the identity of the ion (other than cobalt) which neutralizes some of the acid groups. The color may also be changed by the addition of suitable pigments.

The cobaltous compound may be incorporated into the ionomer by any conventional method, especially those described in the above-mentioned Rees patents. As stated therein, milling the compound into the polymer at a temperature within the 150° to 200° C range is especially suitable. Further details of suitable methods are given in U.S. Pat. No. 3,404,134, granted Oct. 1, 1968, to R. W. Rees, the disclosure of which is incorporated by reference herein.

The following numbered examples illustrate the invention:

EXAMPLES

Example 1

Approximately 2 grams of cobalt stearate, a purple crystalline solid, were milled into 100 grams of DYNH, a low density polyethylene, melt index 2, density 0.918, on a rubber mill at 150° C. The stearate turned blue as it was incorporated into the hot polyethylene to give a uniform translucent product which turned light purple on cooling. The material was pressed into slabs of thickness 0.15 cm and irradiated to a dose of 20 megorads. The irradiated slabs were stretched on heating to 150° C, and held extended until cold. The extended slab was again heated, upon which it shrank to its original length. The color of the slab changed from light purple to dark blue on heating, reverting to light green on cooling. On heating again, the slab returned to dark blue, returning to light green on cooling.

Example 2

Similar results were obtained when an ethylene/vinyl acetate copolymer was used instead of polyethylene. The copolymer was DQDE 1868, a general purpose injection molding copolymer, melt index 2.5.

Comparisons A and B

Attempts were made to incorporate hydrated cobaltous chloride and acetate into polyethylene and an ethylene/vinyl acetate copolymer. These materials remained in particulate form, and a uniform blend could not be obtained. These comparisons indicate that the polymer and salt must be compatible to be suitable for use in the invention.

Example 3

100 grams of Texin 480, a thermoplastic polyurethane formed from a hydroxyl-terminated polyester, methylene-p-phenylene diisocyanate and a diol, were blended on a mill at 130° C with 2 grams of cobalt acetate. The resulting product was uniformly transparent, indicating complete compatibility changing from pale pink when cold to light blue when heated to 200° C. It is contemplated that this material may be crosslinked and rendered heat-recoverable by the method described in co-pending application Ser. No. 502,623 in the name of Edward C. Stivers, and commonly assigned with this application, the disclosure of which is incorporated by reference herein (and to which British Pat. No. 1,133,436 corresponds).

Comparison C

Example 3 was repeated using cobalt stearate instead of cobalt acetate. A dark brown, non-uniform, incompletely mixed material resulted, again illustrating the need for compatibility. It is believed that the highly polar nature of the Texin polyurethane causes solution of the acetate, but not of the longer-chained stearate, ion. This behavior is in conformity with that of the non-polar polyethylene, which is miscible with the stearate but not the acetate.

Examples 4 to 17

In these examples, various cobalt salts were milled into samples of an ionomer manufactured by Messrs. E. I. du Pont de Nemours and Company and sold under their trade mark Surlyn A. The materials used were Surlyn A 1560, an ethylene/unsaturated carboxylic acid copolymer partially neutralized with sodium ions, described by the manufacturers as suitable for injection molding, and Surlyn A 1800, a similar copolymer partially neutralized with zinc ions, described by the manufacturers as suitable for wire and cable insulation. In each case, approximately 2 grams of the cobalt salt were mixed with 100 grams of the resin at 150° C on a rubber mill. The resulting colored material was pressed into slabs 0.15 cm thick and irradiated to a dose of 20 megarads. In each case a material which reversibly changed color as indicated was obtained. The materials used and results obtained are set forth in Table II below.

form part of the immediate environment of the cobalt ions, being close enough to affect the electron levels at ambient temperatures (showing the pink color characteristic of the octahedral cobaltous ion) but not sufficiently close to maintain octahedral coordination of the ion at elevated temperatures (thus causing the intense blue color characteristic of tetrahedral cobaltous ion). The cobalt ion appears to be the only ion capable of reacting in this way with the polymer to render the thermochromism reversible and independent of any variables, such as humidity, outside the polymer other than, of course, the temperature.

Example 18

TABLE II

| EXAMPLE | COBALTOUS COMPOUND | FORMULA | SURLYN A | ROOM TEMPERATURE COLOR | ELEVATED TEMPERATURE COLOR |
|---|---|---|---|---|---|
| 4 | Nitrate | $Co(NO_3)_2 \cdot 6H_2O$ | 1800 | Brown | Green – Blue |
| 5 | Nitrate | $Co(NO_3)_2 \cdot 6H_2O$ | 1560 | Intense violet red | Intense blue |
| 6 | Acetate | $Co(OOC \cdot CH_3)_2 \cdot H_2O$ | 1800 | Light pink – Brown | Intense blue |
| 7 | Acetate | $Co(OOC \cdot CH_3)_2 \cdot H_2O$ | 1560 | Intense violet red | Intense blue |
| 8 | Chloride | $CoCl_2 \cdot 6H_2O$ | 1800 | Light pink – Brown | Intense blue |
| 9 | Chloride | $CoCl_2 \cdot 6H_2O$ | 1560 | Violet | Intense blue |
| 10 | Iodide | $CoI_2 \cdot XH_2O$ | 1800 | Red – Brown | Blue |
| 11 | Iodide | $CoI_2 \cdot XH_2O$ | 1560 | Violet | Blue |
| 12 | Bromide | $CoBr_2 6H_2O$ | 1800 | Light pink – Brown | Intense blue |
| 13 | Bromide | $CoBr_2 \ 6H_2O$ | 1560 | Intense violet red | Intense blue |
| 14 | Stearate | $Co(OOC \cdot (CH_2)_{16}CH_3)_2$ | 1800 | Light pink – Brown | Blue |
| 15 | Stearate | $Co(OOC \cdot (CH_2)_{16}CH_3)_2$ | 1560 | Pink | Blue |
| 16 | Hydroxide | $Co(OH)_2$ | 1800 | Light green | Blue |
| 17 | Hydroxide | $Co(OH)_2$ | 1560 | Violet | Blue |

Comparisons D and E

Attempts were made to repeat Example 4 using cobaltous sulphate and cobaltous hydrogen phosphate. In both cases, the salt remained in clearly visible discrete particles in the resin, which was opaque, and no color change with temperature was observed.

Comparisons F, G, H, J, K, L, M, N, and O

Attempts were made to repeat Examples 4 and 5 with the following compounds:

| Comparison | Compound |
|---|---|
| F | nickel nitrate |
| G | ferric chloride |
| H | ferric fluoride |
| J | manganese chloride |
| K | nickel sulphate |
| L | cupric stearate |
| M | cupric chloride |
| N | cuprous chloride |
| O | ferrous stearate |

With the exception of comparisons G, H and K, where incomplete dispersion was observed as in comparisons D and E, the compounds dispersed in the ionomer to give variously colored compositions which, however, did not show color changes with temperature.

These comparisons serve to point out a unique phenomenon on which one aspect of the present invention is based, namely that divalent cobalt alone interacts with certain polymers to give a thermochromic composition. Compounds of other, apparently similar, transition metals show no interaction with the ionomer. Furthermore, the compounds of cobalt that interact with these polymers are not themselves reversibly thermochromic in the absence of water. It is believed, although the invention is in no way to be regarded as limited by the following tentative explanation, that the polar groups of the polymer, e.g., those carboxyl groups in the ionomer not neutralized by other ions, Example 8 was repeated, except that before crosslinking it the material was injection-molded into the shape of a scorpion having an average body thickness of about 0.25 cm and tapering legs about 4 cm long. On heating, the legs and thinner parts of the body turned blue before the thicker parts of the body, and on cooling the legs and thinner parts reverted more rapidly to the original pink color. The scorpion could be distorted while hot and, if maintained in the distorted configuration on cooling, would remain distorted until heated again to the color-change temperature when it returned to its original molded configuration.

I claim:

1. A heat recoverable, reversibly thermochromic, radiation cross-linked polymeric composition comprising an ionomer selected from the group consisting of an ionomer comprising an ethylene-unsaturated carboxylic acid copolymer neutralized with both zinc and cobaltous ions and an ionomer comprising an ethylene-unsaturated carboxylic acid copolymer neutralized with sodium and cobalt ions, said cobaltous ions in both instances being derived from compounds which will react with a free carboxylic acid group of said ionomer to give a by-product which can be removed from the polymer under conditions of mixing the polymer and said compound.

2. The composition of claim 1 wherein the composition also contains nitrate ions.

3. The composition of claim 1 wherein the composition also contains acetate ions.

4. The composition of claim 1 wherein the composition also contains chloride ions.

5. The composition of claim 1 wherein the composition also contains iodine ions.

6. The composition of claim 1 wherein the composition also contains bromine ions.

7. The composition of claim 1 wherein the composition also contains hydroxyl ions.

8. The composition of claim 1 wherein the composition also contains stearate ions.

* * * * *